F. HUDA.
NON-SKID FOR WHEELS.
APPLICATION FILED FEB. 8, 1919.

1,340,048.

Patented May 11, 1920.

WITNESSES
William P. Goebel.
Geo. H. Beeler

INVENTOR
Frank Huda
BY Munn & Co.
ATTORNEYS

UNITED STATES PATENT OFFICE.

FRANK HUDA, OF PERTH AMBOY, NEW JERSEY.

NON-SKID FOR WHEELS.

1,340,048.  Specification of Letters Patent.  Patented May 11, 1920.

Application filed February 8, 1919. Serial No. 275,840.

*To all whom it may concern:*

Be it known that I, FRANK HUDA, a citizen of the United States, and a resident of Perth Amboy, in the county of Middlesex and State of New Jersey, have invented a new and Improved Non-Skid for Wheels, of which the following is a full, clear, and exact description.

This invention relates to non-skid devices for vehicle wheels and has particular reference to means for applying short chains to wheel tires or treads in a most expeditious, convenient and reliable manner.

Among the objects of this invention is to provide a simple and efficient device for attaching a short chain to a wheel felly, especially a wooden felly, the chain being adapted to pass transversely over the outside of the tire from one side of the felly to the other.

Another object of the invention is to provide an anchorage clip or the like for non-skid chains having means for the most convenient attachment thereof to a wheel felly, positive holding means being applied to the sides of the felly as distinguished from the inner surface thereof.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1:
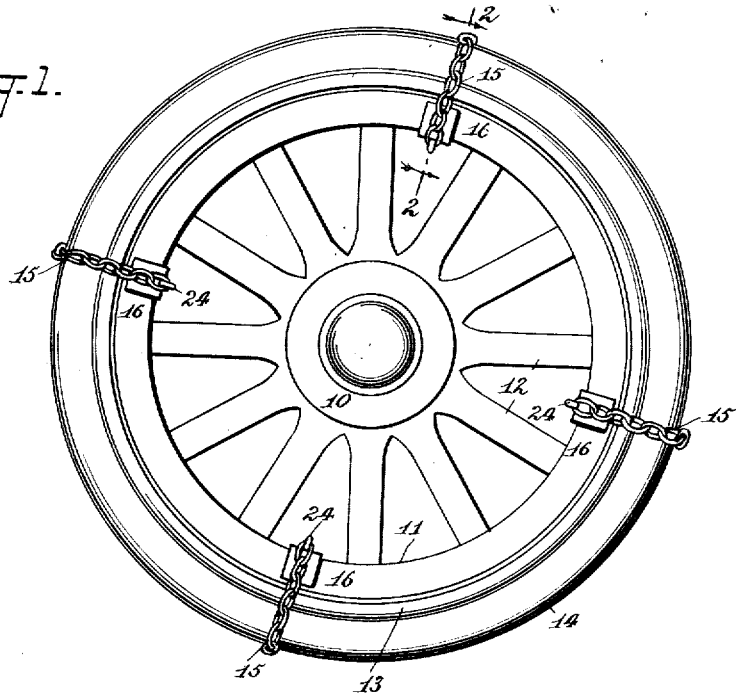
Figure 1 is a side elevation of a conventional wheel having a rubber or resilient tire and equipped with my improvement.
Figure 2:
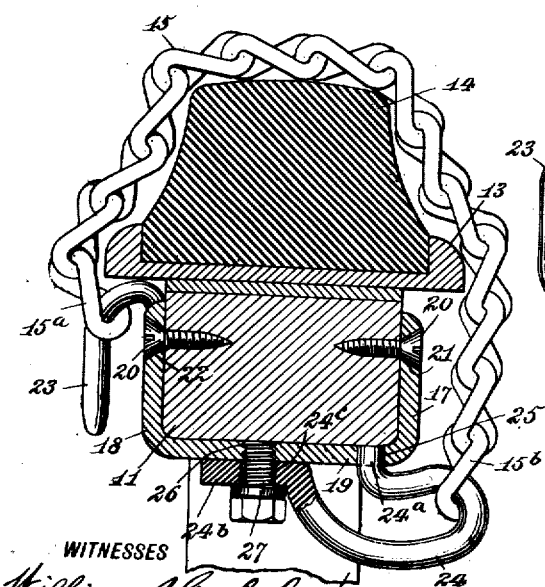
Fig. 2 is a vertical transverse section on the line 2—2 of Fig. 1.
Figure 3:
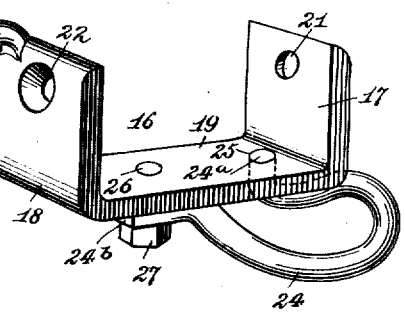
Fig. 3 is a detail perspective view of the anchorage means detached.

Referring now more specifically to the drawings 1 indicates a vehicle wheel having a hub 10, felly 11, spokes 12, a metal rim 13, and any suitable resilient or cushion tire 14. Obviously the wheel may be of any type or design but having preferably a wooden felly, although my improvement may be applied to fellies of a different nature.

15 indicates a short chain the links of which may be of any suitable design and of a length sufficient to span the tread portion of the tire and preferably reach from one edge of the rim 13 to or beyond the opposite edge. Chains being well recognized as efficient non-skid devices it is desirable to provide for the use of a sufficient number of them in connection with each wheel to insure against slipping of the wheel or the digging of a pit in the snow or ice. Consequently since a number, four or five or more of such chains are desired for each wheel it is important that the means for attaching them provides facility and rapidity at the time when they are most needed.

The anchorage or attachment means for the chains includes a plurality of lips 16 each comprising a rigid metallic device substantially U-shaped in cross section and having parallel end portions 17 and 18 and a transverse connecting portion 19. The end portions are adapted to lie flat against the sides of the felly while the middle portion 19 lies substantially flat against the inner surface of the felly. These clips are made in standard sizes for direct application to standard sizes of wheel fellies. In order to attach a clip the operator has but to slip the clip into the place desired, preferably mid-way between two adjacent spokes 12, and then mark the places on the sides of the felly for the application of screws 20 to be passed inward through the holes 21 and 22 formed in the end portions 17 and 18 respectively of the clip. The holes in the felly for the screws are bored or drilled from the sides of the wheel and hence the work may be performed easily and without removing the wheel from the machine. After the holes are bored the screws 20 will be driven into place making an easy attachment and one which is positive and permanent. The strain incident to the traction applied to the chains is borne by the clip upon the felly and only incidentally through the attachment screws 20, the primary function of the screws being simply to hold the clip to the felly. The screws, however, are of sufficient strength to resist any tendency to shear by reason of the circumferential strain applied thereon through the chains.

In applying a chain to any clip, one link thereof as 15$^a$ is slipped upon the open hook 23 formed as an integral part of the end portion 18 of the clip, the bend or crotch portion of the hook being at the outer edge of the part 18 and preferably adjacent to one corner thereof so that the shank portion of the hook, lying parallel to the end portion 18, will be spaced laterally from the axis of the hole 22 so as not to interfere with the introduction of the screw in locking the clip to the felly. The chain is then passed around the outside or tread portion of the tire and a remote link such as 15$^b$ thereof will be engaged in a loop 24, which for this purpose will be free from the clip.

After applying the chain link to the loop 24 one end or point portion thereof 24$^a$ will be slipped directly into the smooth round drill hole 25 formed in the middle portion 19 of the clip, while the opposite end portion 24$^b$ of the loop will be brought into flat engagement with the surface of the portion 19 with a hole 24$^c$ thereof registering with a hole 26 tapped in the flat portion 19 of the clip for the accommodation of a machine screw 27 which after being passed through the screw hole 24$^c$ into the tapped hole 26 will lock the loop positively in engagement with the clip. The loop 24 being closed will insure that the chain cannot become detached therefrom inadvertently. The chain length will be so determined either as a whole or by the selection of links 15$^a$ or 15$^b$ that there shall not be looseness enough for the link 15$^a$ to slip from the shank of the open hook 23. The only time required practically for the application of a chain to one of these clips or removal thereof is that for the manipulation of the locking screw 27 which may be performed readily by any well known tool such as a wrench, or pair of pliers, access to which may readily be had between the spokes.

Special attention is called to the shape of the loop 24, the active bend thereof wherein the chain has direct bearing is in approximate alinement with the end portions 24$^a$ and 24$^b$ of the loop, but at one side of both of them so that while the chain has direct draft upon the bend of the loop there is no tendency for the point or end 24$^a$ to loosen from its hole 25 and practically no tendency for the strain brought upon the chain to break or shear the screw 27.

The device is not only sure and reliable in operation but is neat in appearance and hence is well adapted to be carried as a permanent part of the wheel felly without being particularly noticeable. Obviously the chains detached from the clips or loops may be carried in the tool box or any other convenient place in or on the vehicle when not required for anti-skid purposes.

I claim:

1. In an anti-skid attachment for wheels, a rigid metallic clip having parallel end portions and an intermediate flat connecting portion, said flat connecting portion having a pair of holes one of which is tapped, a chain engaging loop having one end slipped into one of said holes while the other end has a hole registering with the tapped hole, a detachable fastener passing through the latter mentioned loop into the tapped hole and serving thereby to hold both ends of the loop in the position indicated while the mid portion of the loop projects laterally beyond both end portions thereof, and means carried by the remote end portion of the clip to engage and hold another link of the chain, said last mentioned means comprising a hook formed upon one corner of said end portion and extending thence outward parallel to the edge of the end portion and hence at one side of the center of the same.

2. As an article of manufacture, the herein described clip for the attachment of anti-skid means to wheels, the same comprising a rigid U-shaped member adapted to span the inner surface of a felly having two end portions embracing the sides of the felly, said end portions being provided with holes for attachment means, and a hook formed as an integral part of one free corner of one side portion and extending inward parallel to the edge of the side portion, substantially as set forth.

FRANK HUDA.